United States Patent
Kennedy (10) Patent No.: US 10,760,654 B2
(45) Date of Patent: Sep. 1, 2020

(54) VARIABLE SPEED DRIVE SYSTEM

(71) Applicant: Robert C. Kennedy, Mill Spring, NC (US)

(72) Inventor: Robert C. Kennedy, Mill Spring, NC (US)

(*) Notice: Subject to any disclaimer, the term of this patent is extended or adjusted under 35 U.S.C. 154(b) by 1188 days.

(21) Appl. No.: 14/805,121

(22) Filed: Jul. 21, 2015

(65) Prior Publication Data

US 2016/0025192 A1 Jan. 28, 2016

Related U.S. Application Data

(63) Continuation-in-part of application No. 13/889,120, filed on May 7, 2013, now abandoned.

(60) Provisional application No. 61/643,981, filed on May 8, 2012.

(51) Int. Cl.
| | |
|---|---|
| *F16H 3/72* | (2006.01) |
| *F04B 49/10* | (2006.01) |
| *F04B 9/02* | (2006.01) |
| *F04B 49/06* | (2006.01) |

(52) U.S. Cl.
CPC ............... *F16H 3/724* (2013.01); *F04B 9/02* (2013.01); *F04B 49/06* (2013.01); *F04B 49/103* (2013.01)

(58) Field of Classification Search
CPC .. F16H 3/725; F16H 3/724; F04B 9/02; F04B 49/103
See application file for complete search history.

(56) References Cited

U.S. PATENT DOCUMENTS

| | | | |
|---|---|---|---|
| 6,461,265 B1 * | 10/2002 | Graham | F16H 3/724 475/5 |
| 7,211,018 B2 * | 5/2007 | Kimura | F16H 3/724 475/153 |
| 2009/0111635 A1 * | 4/2009 | Conlon | B60K 6/26 475/5 |

* cited by examiner

*Primary Examiner* — Erin D Bishop
(74) *Attorney, Agent, or Firm* — Kim and Lahey Law Firm, LLC; Seann Lahey (57) ABSTRACT

An electronically controlled variable speed mechanical drive to be used in high power applications where using a direct drive motor is not feasible due to weight and size constraints. The variable speed drive components convert an externally driven fixed displacement pump into a variable displacement pump by electronically setting the pump speed to meet flow demands. A single stage pump and a multi-stage pump are so converted, according to the present disclosure.

7 Claims, 7 Drawing Sheets

VARIABLE SPEED DRIVE SYSTEM

REFERENCE TO PROVISIONAL AND PARENT APPLICATIONS

The benefits of priority of Provisional Application No. 61/643,981, filed May 8, 2012, and of regular Utility application Ser. No. 13/889,120, filed May 7, 2013, are hereby claimed.

FIELD OF THE INVENTION

The present invention relates generally to an electronically controlled variable speed drive and pertains particularly to aircraft pumps. The disclosed pump drive can transform a fixed displacement pump into a variable displacement pump so that flow on demand can be achieved. It can be coupled to either a single or a two stage fixed displacement pump and is intended to be used in high horsepower conditions where it is not practical to use a motor driven device.

Other applications disclosed include decoupling the rotary speed of an alternator or generator from its prime driver so that the alternator or generator can operate at its best efficiency speed no matter the prime driver speed.

BACKGROUND OF THE ART

For aviation platforms, the goal is to design the highest power density system while exceeding the required reliability standards. For aircraft pumps, thermal efficiency is especially important due to the added role of fuel and oil being heat sinks for various subsystems. Aircraft pumps are typically mounted to and driven by the accessory drive gearbox, which in turn is driven by the high-pressure gas turbine engine spool. Since the accessory engine gearbox has a constant gear ratio, the aircraft pump input rotary speed is directly related to engine spool speed.

Pump efficiency is maximized when the fluid displacement of a pump matches the particular demand requirement of the engine and associated subsystems. To accomplish this, various attempts have historically been made by others to improve pump efficiency by employing variable displacement pumps coupled with various valving arrangements.

Today's variable displacement pumps typically vary the fluid pumped per revolution by varying the stroke of the pumping element, such as a piston in a piston pump or a vane in a vane pump. Another technique that is employed is a multi-stage pump that has the capability to "unload" or switch a stage on and off.

The fore-mentioned systems do improve pump thermal efficiency but at the expense of increased weight and cost. For instance, an actuation system is required to move a cam so that the stroke of a vane pump can be varied, and in a multi-stage pump, two sets of pumping elements are required as well as special valving to unload a stage. Additionally, when a pumping stage is unloaded the "windage" and "churning" energy losses are still present due to the higher than required pump input speed.

Embodiments disclosed include a variable speed drive that allows a high horsepower, gearbox driven pump to behave like a motor driven pump without the weight penalty induced by a high horsepower motor. This drive is capable of setting and maintaining the pump rotary speed independent of the external gearbox speed so that the pump can deliver the required flow displacement for any given flight condition. Other advantages include the capability to constantly operate an automotive alternator at its best efficiency speed no matter what the engine speed is. These and other advantages of the invention, as well as additional inventive features, will be apparent from the description of the invention provided herein.

SUMMARY OF THE INVENTION

An electronically controlled variable speed drive consists of a compound planetary gear set, a motor, and an electronic controller. The drive is driven by an external power source, such as an aircraft engine, and depending on the application, it may contain either one or two output drive shafts. The variable speed drive is capable of continuously varying the gear ratio within a compound planetary gear set by applying an electronically controlled retarding torque to a motor. It is capable of achieving from a 1:1 gear ratio to the maximum gear ratio determined by the number of teeth on the gears located within the compound planetary gear set.

In one aspect, the invention provides a means of electronically setting and controlling the output speed of the drive shaft(s). The speed controller electronics is arranged as a dynamic braking system so that a retarding torque can be developed by the motor, whose rotor is attached to the compound planetary gear set output ring gear. If dynamic braking is off, then the overall gear ratio is 1:1. If dynamic braking is on, then the output shaft with the sun gear rotates faster than the input drive speed; and the output shaft attached to the compound planetary gear set's output ring gear rotates slower and thus the motor rotor rotates slower than the input drive speed. The microprocessor compares the required output speed(s) against the measured output speed (s) and adjusts the retarding torque accordingly. To insure that the sun gear never rotates slower than the input ring gear, a one way bearing helps to support the sun gear carrying the output drive shaft.

In another aspect, the invention provides a means of transforming a fixed displacement pump into a variable displacement pump to provide flow on demand.

In yet another aspect, the invention provides a means of maintaining the constant speed of an alternator or generator no matter what the input drive speed is.

While the invention will be described in connection with certain preferred embodiments, there is no intent to limit it to those embodiments. On the contrary, the intent is to cover all alternatives, modifications, and equivalents as included within the spirit and scope of the invention as defined by the appended claims.

DETAILED DESCRIPTION OF THE INVENTION

Figure 1:
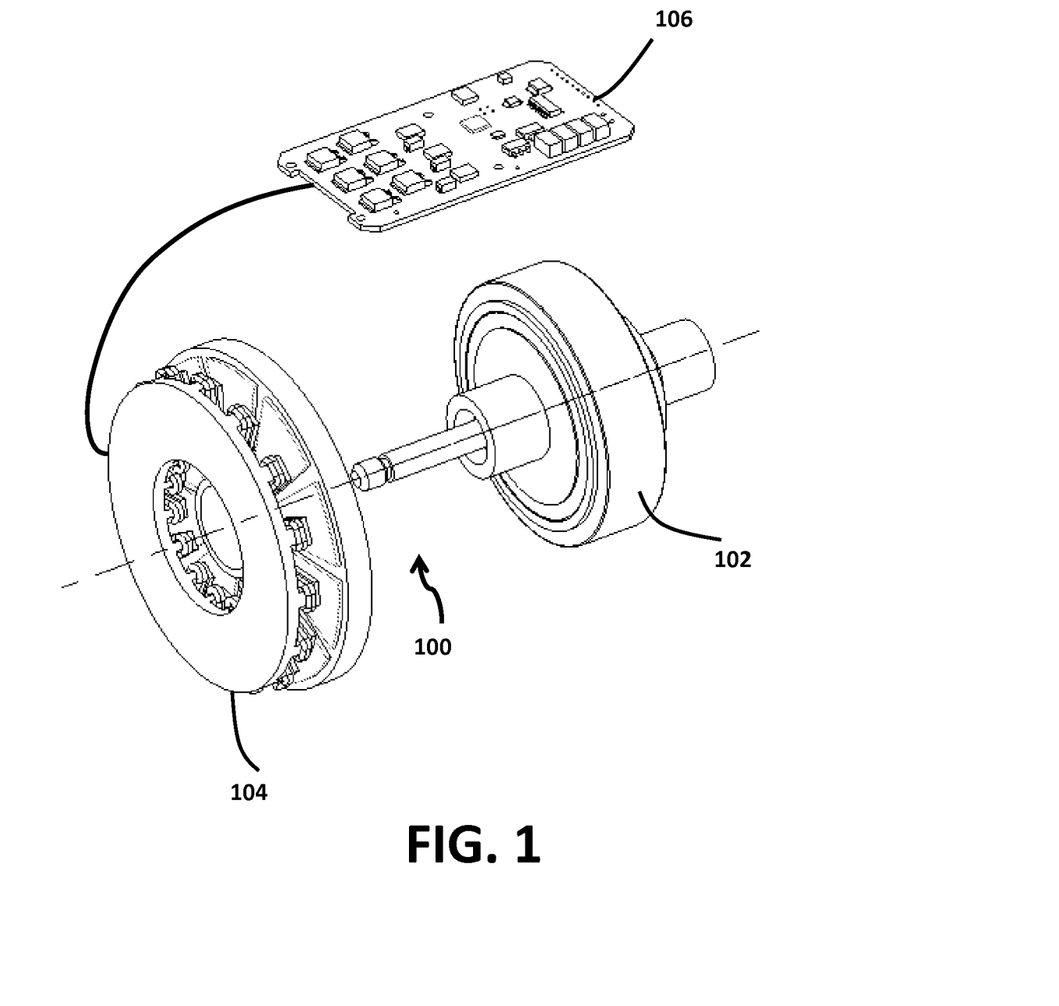
FIG. 1 is an exploded view of a variable speed drive assembly according to one embodiment of the invention.

An exploded view of the variable speed drive's 100 three main sub-assemblies according to one embodiment of the invention is shown in FIG. 1. In this embodiment, the variable speed drive 100 includes a compound planetary gear set 102, a motor 104, and an electronic control module 106, all of which may be contained within a common structure.

Figure 2:
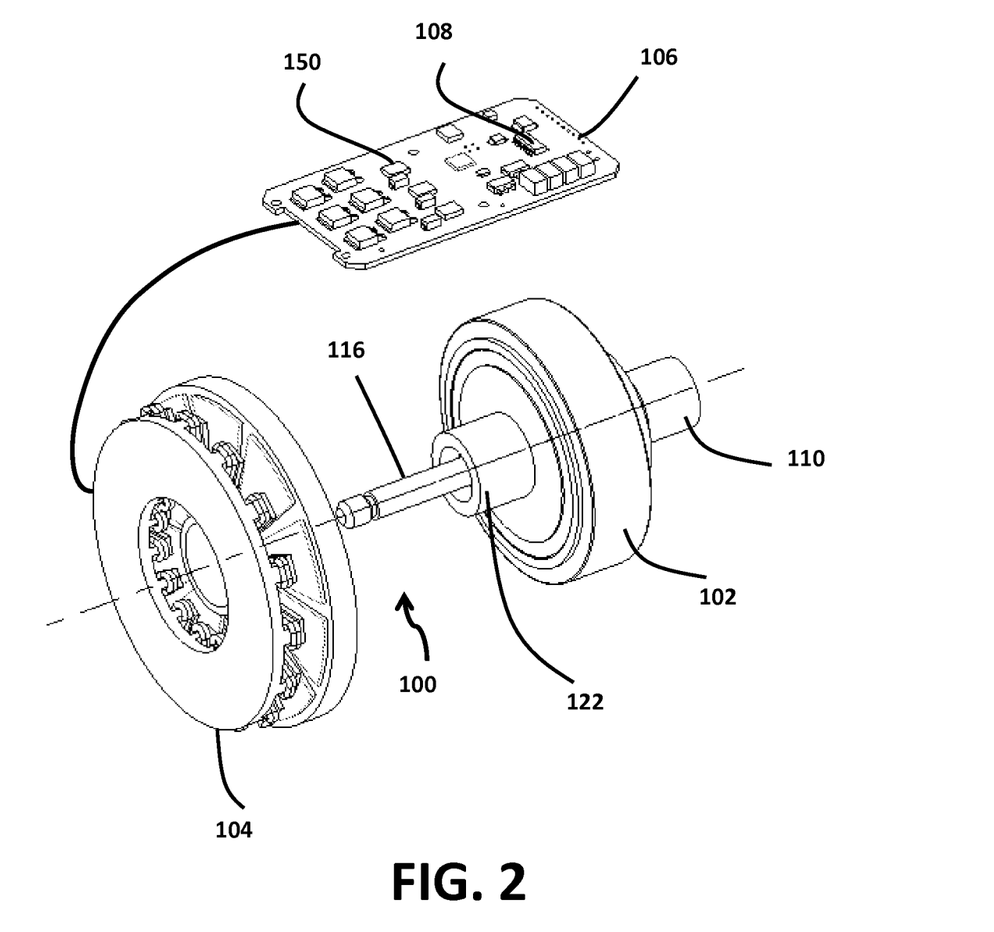
FIG. 2 is an exploded view of a variable speed drive assembly according to one embodiment of the invention.

An exploded view depicting the variable speed drive 100 according to an embodiment of the invention is also shown in FIG. 2. An external drive connects to and drives internal ring gear 110, which is part of the compound planetary gear set 102 subassembly. Motor 104 connects to and is rotated by internal ring gear 122, which is part of the compound planetary gear set 102 subassembly. Output drive shaft 116, a part of the compound planetary gear set 102 subassembly, rotates at a speed determined by a gear ratio of the gear set 102. The current being produced by motor 104 rotating is electrically flowing through motor 104 windings and the electronic control module 106, which contains microprocessor 108 and dynamic braking circuitry, including one or more power resistors 150 to absorb the electrical energy not required for torque generation. Microprocessor 108 monitors the speed of output drive shaft 116 against a speed demand input signal. Microprocessor 108 changes the speed of output drive shaft 116 by controlling the torque generating current electrically flowing through motor 104 windings. As motor 104 torque is varied, compound planetary gear set 102 overall gear ratio is also varied. Therefore, the speed ratio between internal ring gear 110 and output drive shaft 116 can be set by microprocessor 108.

Figure 3:
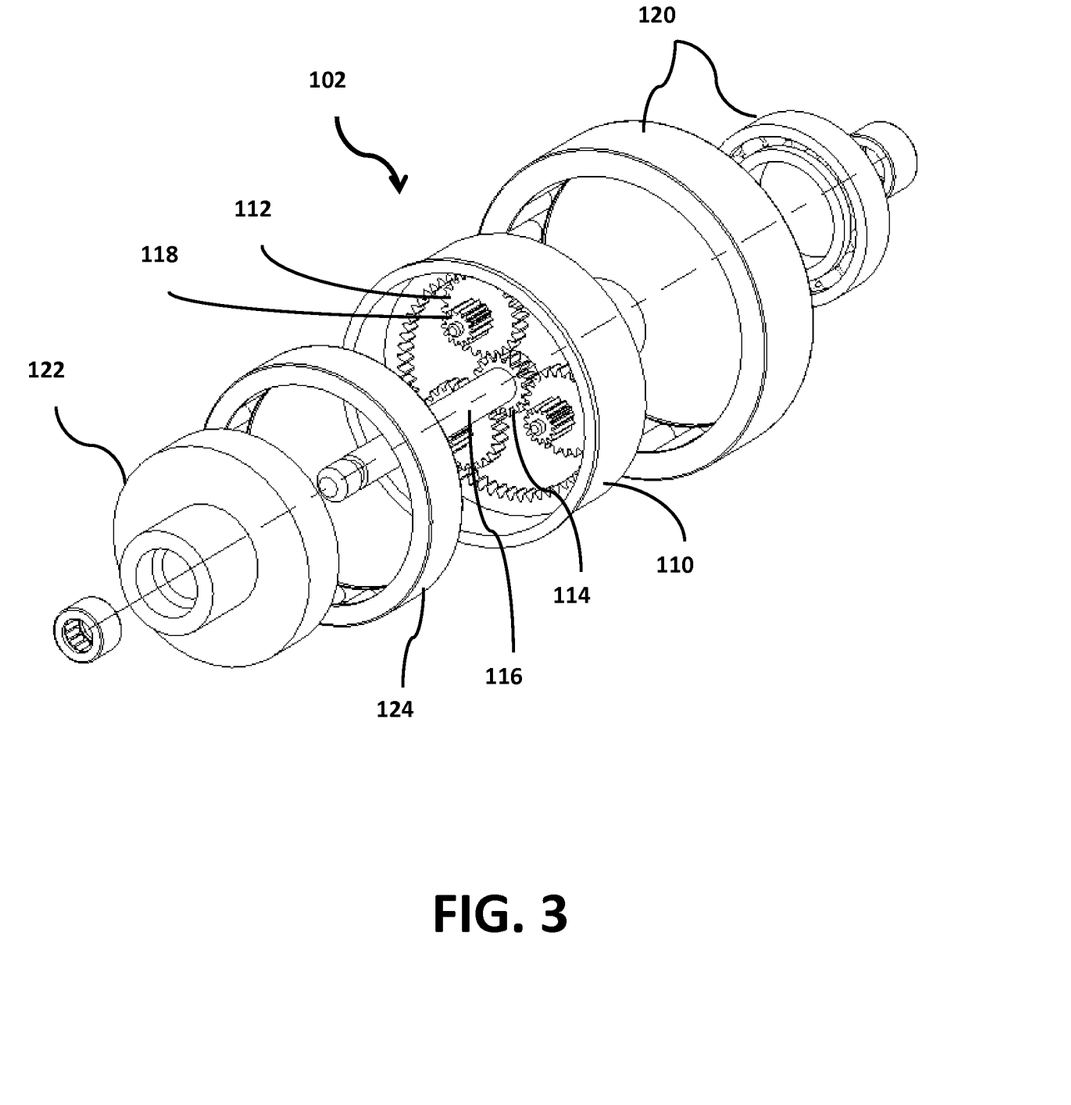
FIG. 3 is an exploded view of a compound planetary gear set according to one embodiment of the invention.

The compound planetary gear set 102 according to an embodiment of the invention is depicted in more detail in FIG. 3. The compound planetary gear set 102 includes an internal ring gear 110, which rotates on bearings 120 and engages with planetary gears 112 as gear set 102 is rotated by an external drive. Planetary gears 112 rotate the sun gear 114, which rotates the output drive shaft 116. Planetary gears 118 are formed integrally with or are rigidly attached to planetary gears 112 and rotate with such planetary gears 112 around sun gear 114. Planetary gears 118 in turn rotate internal ring gear 122, which is supported by bearing 124 and rigidly connects to motor 104.

Figure 4:
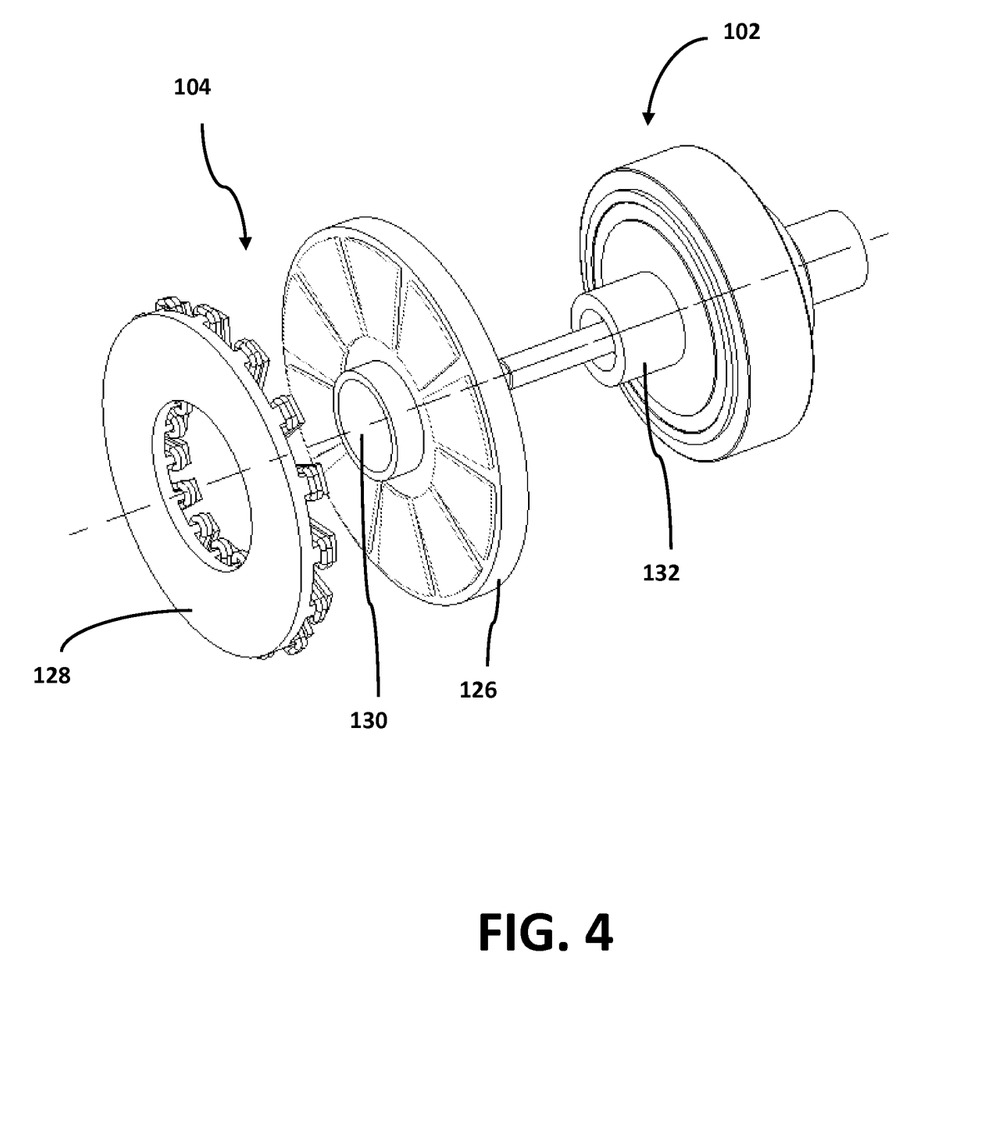
FIG. 4 is an exploded view of the installation of the motor rotor and a compound planetary gear set, according to one embodiment of the invention.

FIG. 4 shows the installation of the compound planetary gear set 102 and motor 104 according to an embodiment of the invention. Motor 104 consists of two sub-assemblies, a rotating rotor 126 and a stationary stator 128. The rotor 126 has a diameter 130 that fits onto and is located by internal ring gear 122 diameter 132.

Figure 5:
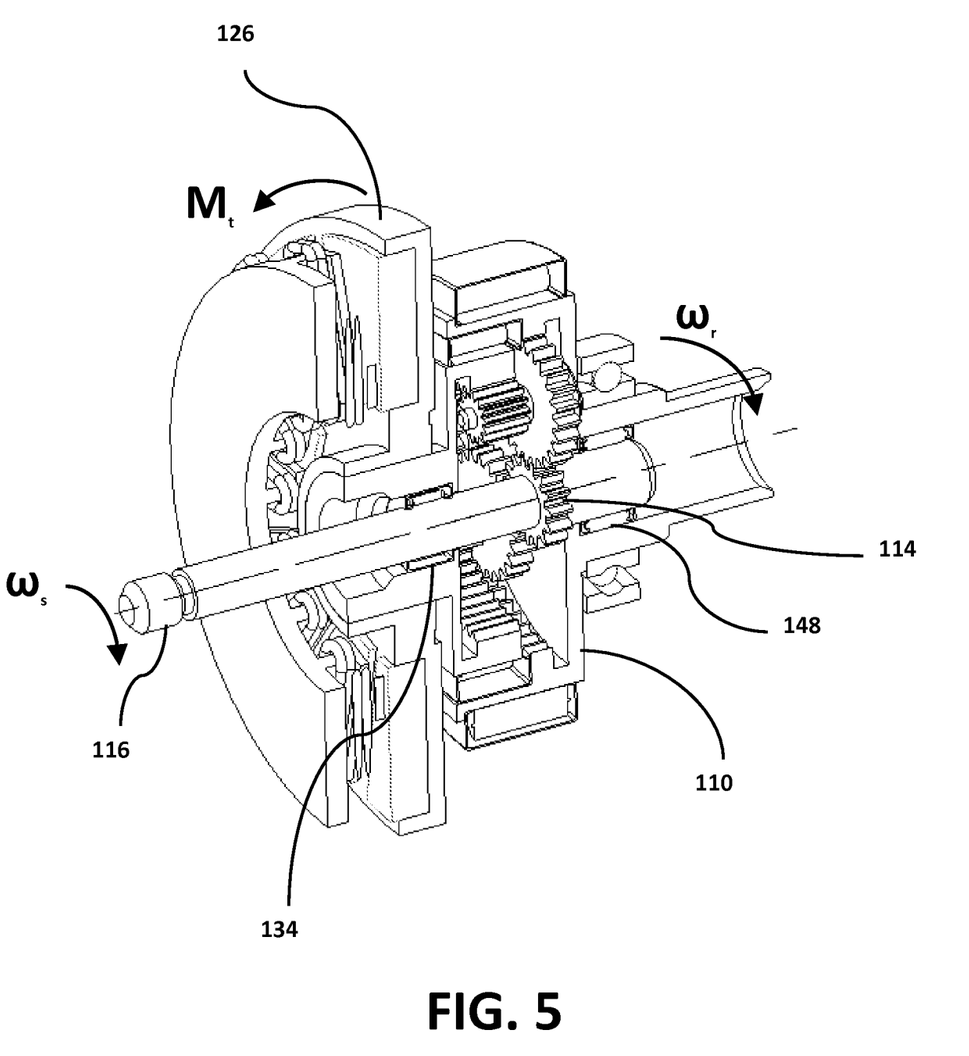
FIG. 5 is an isometric cross-section of an output drive shaft installed in said compound planetary gear set and showing a motor installed onto said compound planetary gear set, according to one embodiment of the invention.

FIG. 5 illustrates a cross-section depicting the rotational mechanics of the output drive shaft 116 according to one embodiment of the invention. The output drive shaft 116 along with the integral sun gear 114 are supported by rolling element bearing 134 and a one way bearing (anti-reverse bearing) 148. The one way bearing 148 transmits torque between the output drive shaft 116 and the internal ring gear 110 in one direction and while allowing free rotation in the opposite direction. This relationship insures that the output drive shaft 116 cannot rotate at a slower speed than the externally driven input internal ring gear 110. With rotor 126 attached to internal ring gear 122, when torque is applied by motor 104, internal ring gear 122 changes rotational speed, which then changes the rotational speed of output drive shaft 116. Therefore, the gear ratio between the internal ring gear 110 and output drive shaft 116 can be varied and set by adjusting the torque on internal ring gear 122 via motor 104.

Figure 6:
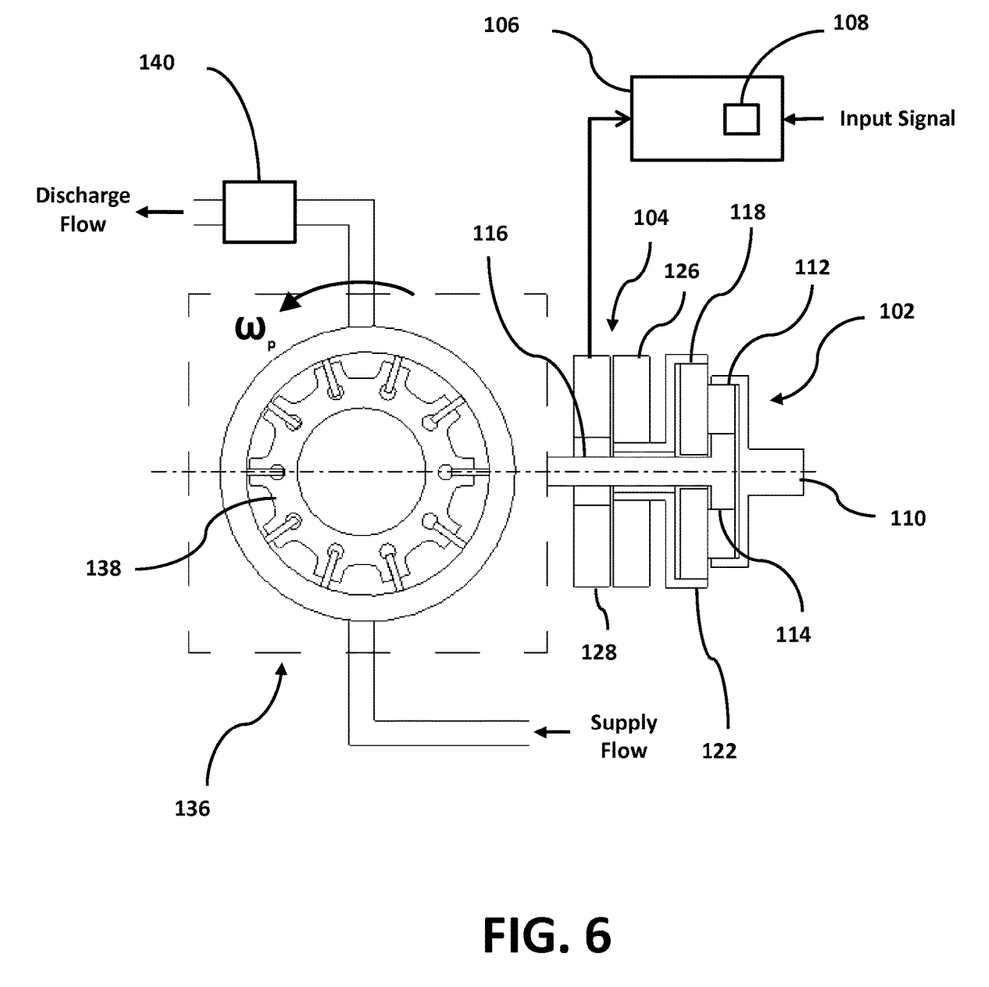
FIG. 6 schematically depicts the variable speed drive driving a fixed displacement pump, according to one embodiment of the invention.

FIG. 6 schematically illustrates how a single stage fixed displacement pump 136 is transformed into a variable displacement pump according to one embodiment of the invention. Pumping element 138 is connected to and rotated by output drive shaft 116, which is integral to sun gear 114. With internal ring gear 110 driven by an external drive and rotating at a constant speed, an input signal that could represent required flow, is transmitted to microprocessor 108, which is located within electronic control module 106. Microprocessor 108 compares the measured flow signal from sensor 140 against the input signal and directs the voltage being generated by motor 104 through the electronic control module 106 dynamic braking circuit accordingly. If the discharge flow measured by sensor 140 is lower than required, then the current flowing through motor 104 is increased, which in turn increases retarding torque. An increase in retarding torque increases the overall gear ratio in the compound planetary gear set 102 and therefore the rotary speed of pumping element 138 is increased. If supply flow is higher than required the rotary speed of pumping element 138 is decreased by decreasing motor 104 retarding toque.

Figure 7:
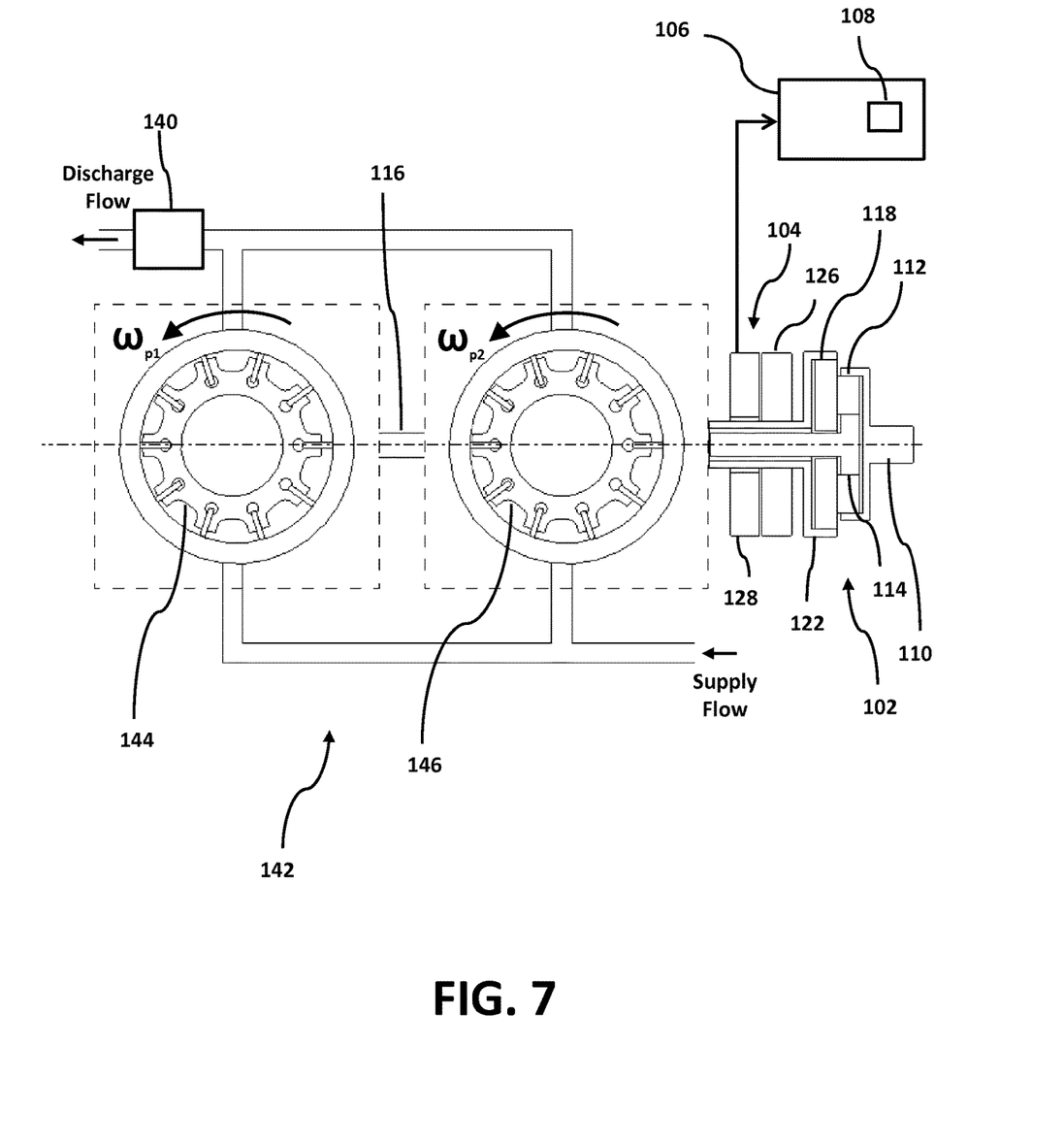
FIG. 7 schematically depicts the variable speed drive driving a two-stage fixed-displacement pump, according to another embodiment of the invention.

FIG. 7 schematically illustrates how a multi-stage fixed displacement pump 142 is transformed into a variable displacement pump according to one embodiment of the invention. Pumping element 144 is connected to and rotated by output drive shaft 116, which is integral to sun gear 114, and pumping element 146 is connected to and rotated by internal ring gear 122. When the retarding torque developed by motor 104 is increased by the electronic control module 106, the rotary speed of pumping element 144 increases and the rotary speed of pumping element 146 decreases. When the retarding torque developed by motor 104 is decreased by the electronic control module 106, the rotary speed of pumping element 144 decreases and the rotary speed of pumping element 146 increases. If dynamic braking is removed by the electronic control module 106, the rotary speed of pumping elements 146 and 144 are equal and equal the rotary speed of internal ring gear 110.

The maximum achievable gear ratio is determined by the compound planetary gear set 102 internal geometry.

The overall gear ratio in compound planetary gear set 102 is increased when retarding torque developed by motor 104 is increased.

The overall gear ratio in compound planetary gear set 102 is decreased when retarding torque developed by motor 104 is decreased.

When motor 104 retarding torque is removed, the gear ratio between internal ring gear 110 and output drive shaft 116 is 1:1.

When motor 104 is rotating, the electronic control module 106 is receiving a voltage from motor 104. Based upon the input signal, microprocessor 108 determines the percent of total current required for motor 104. The balance of the current is sent to a dynamic braking circuit containing power resistor(s) 150.

The electronic control module 106 utilizes a closed loop control system to maintain a constant torque and therefore gear ratio.

Many variations may be made in the invention as shown and in its manner of use without departing from the principles of the invention as described herein and/or as claimed as our invention. Minor variations will not avoid the use of the invention.

I claim as my invention:

1. A variable speed drive for driving a device, the device having at least one rotary element, the variable speed drive comprising:
   a compound planetary gear set driving said rotary element of the device at a speed via an output drive shaft;
   said compound planetary gear set including a first internal ring gear adapted for engage an external drive, a plurality of planetary gears engaging said first internal ring pear and being operatively connected to a sun gear operatively associated with said output drive shaft, and a second internal ring gear engaging said plurality of planetary gears with a bearing ring interconnecting said first and second internal ring gears;
   a motor operatively connected to said compound planetary gear set, wherein said motor includes a stationary stator for applying variable amounts of torque against a rotor fixed to said second internal ring gear of said compound planetary gear set so that said rotor rotates with and controls the rotation speed of said second internal ring gear to continuously vary the rotation speed of said compound planetary gear set by applying variable amounts of torque on said rotor to produce a variable speed ratio on said output drive shaft;
   a motor control comprising an electronic control module that receives an input signal and applies said variable amounts of torque to said rotor to adjust the rotation speed of said second internal ring gear to vary the speed of said output drive shaft based on said input signal; and,
   wherein said motor control contains power resistors for controlling an amount of current available for said stationary stator to apply torque to said rotor;
   whereby the variable speed ratio of said output drive shaft is adjusted only by the applicant of torque through electrical current to said rotor without the application of mechanical constraints to limit rotation of any portion of said planetary gear set.

2. The variable speed drive as defined in claim 1, wherein the electronic control module is configured as a dynamic braking system that sets said torque developed by the motor so as to limit the rotary speed of said second internal ring gear so that the rotation speed of said output drive shaft is increased.

3. The variable speed drive as defined in claim 1, wherein the torque developed by the motor provides the variable speed ratio between said compound planetary gear set and said output drive shaft by driving said compound planetary gear set at different speeds.

4. The variable speed drive as defined in claim 1, wherein the output drive speed of said output drive shaft is adjusted by varying the torque developed by said motor to vary the rotation speed as between said first internal ring gear operatively associated with said external drive and said sun gear operatively associated with said output drive shaft.

5. The variable speed drive as defined in claim 1, wherein said first internal ring gear is adapted to engage the external drive so that rotation of said first internal ring gear causes said plurality of planetary gears to rotate and orbit around said sun gear which in turn drives said second internal ring gear and said output drive shaft.

6. The variable speed drive as defined in claim 5, wherein said sun gear is carried by said output drive shaft and driven by said plurality of planetary gears in turn drives.

7. The variable speed drive as defined in claim 5, wherein spinning of said rotor generates a voltage proportional to the rotation speed of said rotor.

* * * * *

UNITED STATES PATENT AND TRADEMARK OFFICE
CERTIFICATE OF CORRECTION

| | |
|---|---|
| PATENT NO. | : 10,760,654 B2 |
| APPLICATION NO. | : 14/805121 |
| DATED | : September 1, 2020 |
| INVENTOR(S) | : Robert C. Kennedy |

Page 1 of 1

It is certified that error appears in the above-identified patent and that said Letters Patent is hereby corrected as shown below:

In the Specification

At Column 5, Line 3, add the following, before the statement at Line 4 which states "I claim as my invention:":
"This invention was made with Government support under N68335-19-C-0499 awarded by the Department of the Navy. The Government has certain rights in this invention."

Signed and Sealed this
Third Day of September, 2024

Katherine Kelly Vidal
*Director of the United States Patent and Trademark Office*